United States Patent
Nohara et al.

(10) Patent No.: US 12,486,828 B2
(45) Date of Patent: Dec. 2, 2025

(54) BRAKING FORCE MEASURING METHOD

(71) Applicant: Nabtesco Corporation, Tokyo (JP)

(72) Inventors: Osamu Nohara, Tokyo (JP); Hirofumi Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/404,384

(22) Filed: Jan. 4, 2024

(65) Prior Publication Data

US 2024/0240612 A1    Jul. 18, 2024

(30) Foreign Application Priority Data

Jan. 13, 2023  (JP) ................. 2023-003781

(51) Int. Cl.
*F03D 7/02*    (2006.01)
(52) U.S. Cl.
CPC ...... *F03D 7/0244* (2013.01); *F05B 2270/331* (2013.01)
(58) Field of Classification Search
CPC .............................. F03D 17/011; F03D 7/0244
See application file for complete search history.

(56) References Cited

U.S. PATENT DOCUMENTS

| | | | |
|---|---|---|---|
| 10,100,810 B2 | 10/2018 | Frederiksen et al. | |
| 11,047,366 B2* | 6/2021 | Nohara | F03D 7/0244 |
| 11,614,072 B2* | 3/2023 | Nohara | F03D 7/0248 |
| | | | 416/1 |
| 11,732,689 B2* | 8/2023 | Kodama | F03D 7/0204 |
| | | | 415/118 |
| 2021/0199088 A1* | 7/2021 | Nohara | F03D 7/0244 |
| 2021/0199089 A1* | 7/2021 | Kodama | F03D 7/0248 |
| 2022/0074387 A1 | 3/2022 | Asakawa | |
| 2022/0268257 A1 | 8/2022 | Nohara | |

FOREIGN PATENT DOCUMENTS

JP    2015-140777 A    8/2015

OTHER PUBLICATIONS

Extended European Search Report dated Jun. 7, 2024, issued in corresponding European Patent Application No. 24151365.4 (7 pgs.).

* cited by examiner

*Primary Examiner* — Courtney D Heinle
*Assistant Examiner* — John S Hunter, Jr.
(74) *Attorney, Agent, or Firm* — Pillsbury Winthrop Shaw Pittman, LLP

(57) ABSTRACT

A braking force measuring method for a wind turbine is provided. The wind turbine includes a ring gear, a yaw drive device driving a pinion meshing with the ring gear to make the wind turbine turn, and a brake device that prevents the nacelle from turning in the yaw direction by pressing a friction body against the ring gear. The method includes: braking the ring gear by the brake device; measuring a load on a rotating shaft of the pinion that mesh with the braked ring gear; determining a maximum value of the load during a time period when input torque is applied to the pinion, the input torque being applied with the nacelle held still and until the friction body begins to slip and the nacelle begins to turn in the yaw direction; and converting the determined load to the braking force.

6 Claims, 9 Drawing Sheets

BRAKING FORCE MEASURING METHOD

CROSS-REFERENCE TO RELATED APPLICATIONS

This application is based on and claims the benefit of priority from Japanese Patent Application Serial No. 2023-003781 (filed on Jan. 13, 2023), the contents of which are hereby incorporated by reference in its entirety.

TECHNICAL FIELD

The present disclosure relates to a braking force measuring method.

BACKGROUND

The wind turbine has a brake device that brakes its nacelle by pressing a friction body against a ring gear that holds a yaw unit (nacelle) of blades. Because the rotational force of the nacelle rotated by wind power is quite large, the braking force of the brake device also becomes large. It is difficult to directly measure the braking force of the brake device with, for example, a stress sensor. Conventionally, a wire is tied to the blade or hub while the ring gear is braked and the wire is then pulled with heavy machinery to make the nacelle turn. The actual braking force is measured as the external force at which the nacelle begins to turn (see, for example, Japanese Patent Application Publication 2015-140777).

However, in the above case, it is necessary to use large heavy machinery, moreover the load is concentrated on the blade or hub where the wire is tied, which causes a risk of failure or damage. Therefore, there is a need for a method to safely and easily measure the braking force of the brake device.

SUMMARY

The present disclosure is intended to overcome the above drawback, and one object is to provide a method of measuring braking force with which it is possible to safely and easily measure the braking force of the brake device.

To overcome the above drawback, aspects of the present disclosure are configured as follows. (1) Provided is a method of measuring a braking force of a brake device in a wind turbine. The wind turbine including: a ring gear fixed to a tower of the wind turbine or a nacelle of the wind turbine; a yaw drive device driving a pinion that meshes with the ring gear to turn the wind turbine in a yaw direction, the yaw drive device being fixed to the other of the tower or the nacelle; and the brake device pressing a friction body against the ring gear to keep the nacelle from turning in the yaw direction. The method includes: a brake step of braking the ring gear by the brake device; a measurement step of measuring a load on a rotating shaft of the pinion that mesh with the braked ring gear; a determination step of determining a maximum value of the load during a time period when input torque is applied to the pinion, the input torque being applied with the nacelle held still, the input torque being applied until the friction body begins to slip and the nacelle begins to turn in the yaw direction; and a conversion step of converting the determined load to the braking force.

With this configuration, the braking force of the brake device can be measured by applying input torque to the pinion until the friction body begins to slip and the nacelle that has been held still begins to turn in the yaw direction, determining the maximum value of the load during that time, and converting the determined load (maximum value) to the braking force. Thus, the braking force of the brake device can be measured without the need to directly pull the blades or hub with large heavy machinery. Therefore, the braking force of the brake device can be measured safely and easily.

(2) In the method described in (1), the method further includes an attachment step of attaching a jig to the rotating shaft of the pinion, the jig includes an input portion to which the input torque is inputted from an external power device and a worm gear that reduces and transmits the input torque, the input portion and the worm gear forming a single body, In the determination step, the input torque is applied to the pinion from the external power device with the nacelle held still and until the friction body begins to slip and the nacelle begins to turn in the yaw direction, and the maximum value of the load during the time period is determined.

(3) In the method described in (2), the wind turbine includes the plurality of pinions meshing with the ring gear. In the attachment step, the jig is attached to each of the plurality of pinions. In the determination step, with the nacelle held still, the first input torque may be inputted from the external power device to an input portion of the first jig among the plurality of jigs. The second input torque may be subsequently inputted from the external power device to an input portion of the second jig located diagonally to the first jig on the circumference along the ring gear among the plurality of jigs.

(4) In the method described in (2) or (3), the jig further includes a torque meter attached to a rotating shaft that connects the input portion and the worm gear. In the measurement step, a value obtained by the torque meter may be used as the measured load.

(5) In the method described in (1), the wind turbine includes a bolt strain sensor for measuring strain on a bolt that attaches the yaw drive device to the nacelle, in the measurement step, the value detected by the bolt strain sensor may be used as the measured load.

(6) In the method described in (5), in the determination step, the input torque is applied to the pinion from the yaw drive device with the nacelle held still and until the friction body begins to slip and the nacelle begins to turn in the yaw direction, and the maximum value of the load during the time period is determined.

Advantageous Effects

According to the aspects of the present disclosure, the braking force of the brake device can be measured safely and easily.

DESCRIPTION OF THE EMBODIMENTS

Figure 1:
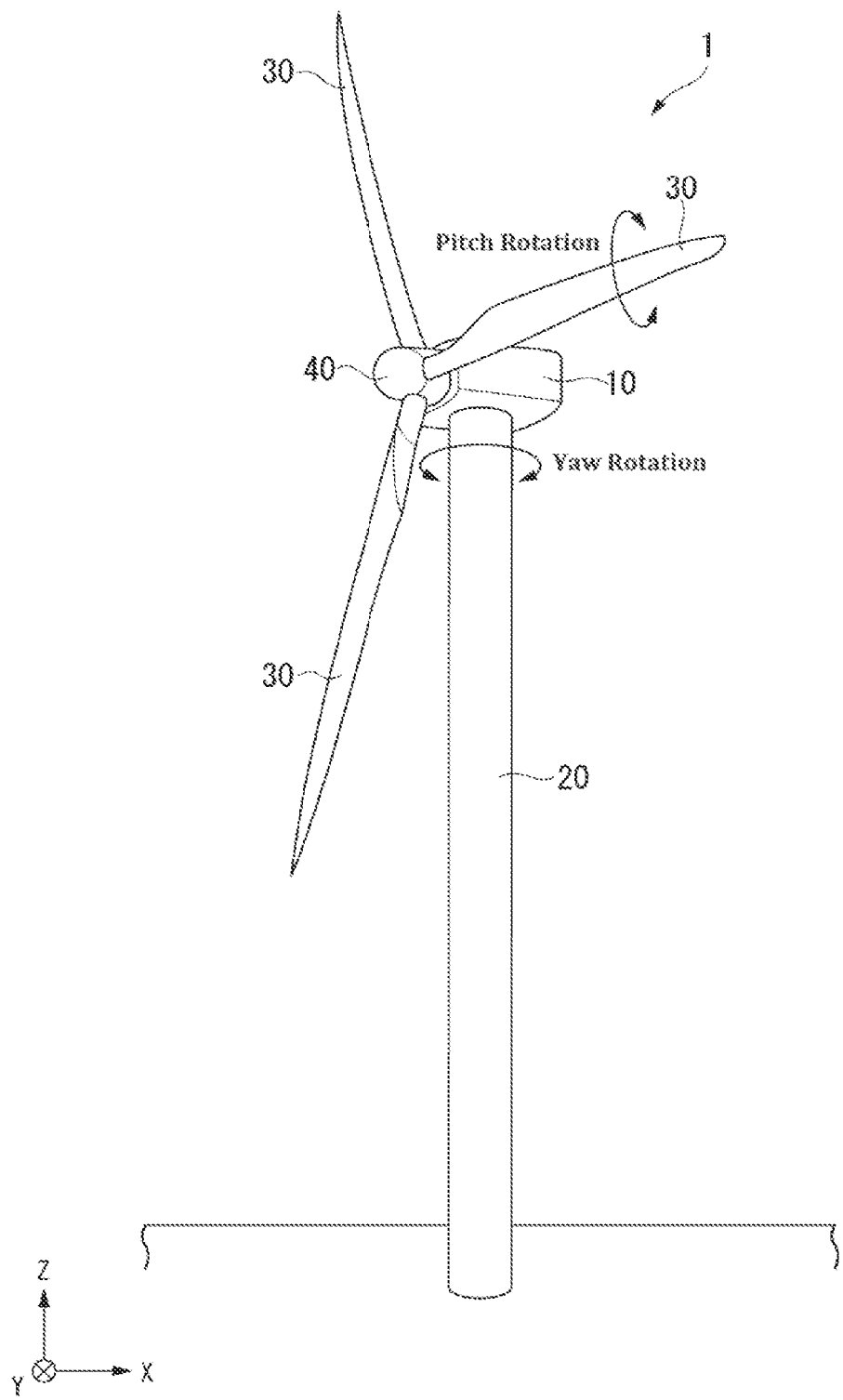
FIG. 1 is a perspective view of a wind turbine according to a first embodiment.

A method of measuring a braking force of a brake device in a wind turbine will be now described with reference to the accompanying drawings In the following description, terms such as "parallel," "orthogonal," "around" and "coaxial" describe relative or absolute positions. These terms are not only strictly used but also allow some tolerances and relative differences in angle and distance as long as the same effects can be still produced. In the drawings used for the following description, members are shown to different scales into recognizable sizes.

<Wind Turbine>

FIG. 1 is a perspective view of a wind turbine according to the first embodiment. As shown in FIG. 1, the wind turbine 1 includes a nacelle 10, a tower 20, blades 30, and a hub 40.

In the following description, an XYZ orthogonal coordinate system is used as required. For example, the X and Y directions are mutually orthogonal in the horizontal plane. The Z direction is orthogonal to the X and Y directions (vertical direction). The following description is made with the arrows shown in the drawings indicating the X, Y and Z directions, and the head side and the tail side of each arrow indicate the positive (+) side and the negative (−) side, respectively. The upper side and the lower side in the vertical direction are respectively denoted as the +Z side and the −Z side.

The nacelle 10 is mounted on the top end (the end in the +Z direction) of the tower 20. The blades 30 are mounted to the nacelle 10 via the hub 40. The nacelle 10 turns the blades 30 and hub 40 to adjust their orientation in the yaw direction.

The tower 20 is installed on the land or on the sea, for example. The tower 20 extends upward in the vertical direction from the land or the sea.

The blades 30 receive wind force and generate a rotational force. In the example of FIG. 1, the number of blades 30 is three, but the embodiment is not limited. For example, the number of the blades 30 can be changed depending on design specifications.

The hub 40 is mounted to the nacelle 10. Three (can be any number more than one) blades 30 are mounted to the hub 40. The hub 40 is configured to transmit to a rotating shaft (not shown) the rotational force (motive power) generated by the blades 30 when acted upon by a force of wind. The hub 40 transmits the motive power generated by the wind force to the nacelle 10 via the rotating shaft.

The hub 40 includes pitch drive mechanisms (not shown) for generating a pitch drive force for rotating the blades 30 in the pitch direction. Each blade 30 is provided with a pitch drive mechanism. The pitch drive mechanisms rotate the blades 30 in the pitch direction to control the angles of the blades 30 in accordance with the wind velocity.

In the wind turbine 1, the motive power generated by the rotation of the blades 30 is transmitted from the hub 40 to a power generator (not shown) in the nacelle 10. In the wind turbine 1, the generator converts the motive power into electric power. In this way, the wind turbine 1 generates power from wind.

Figure 2:
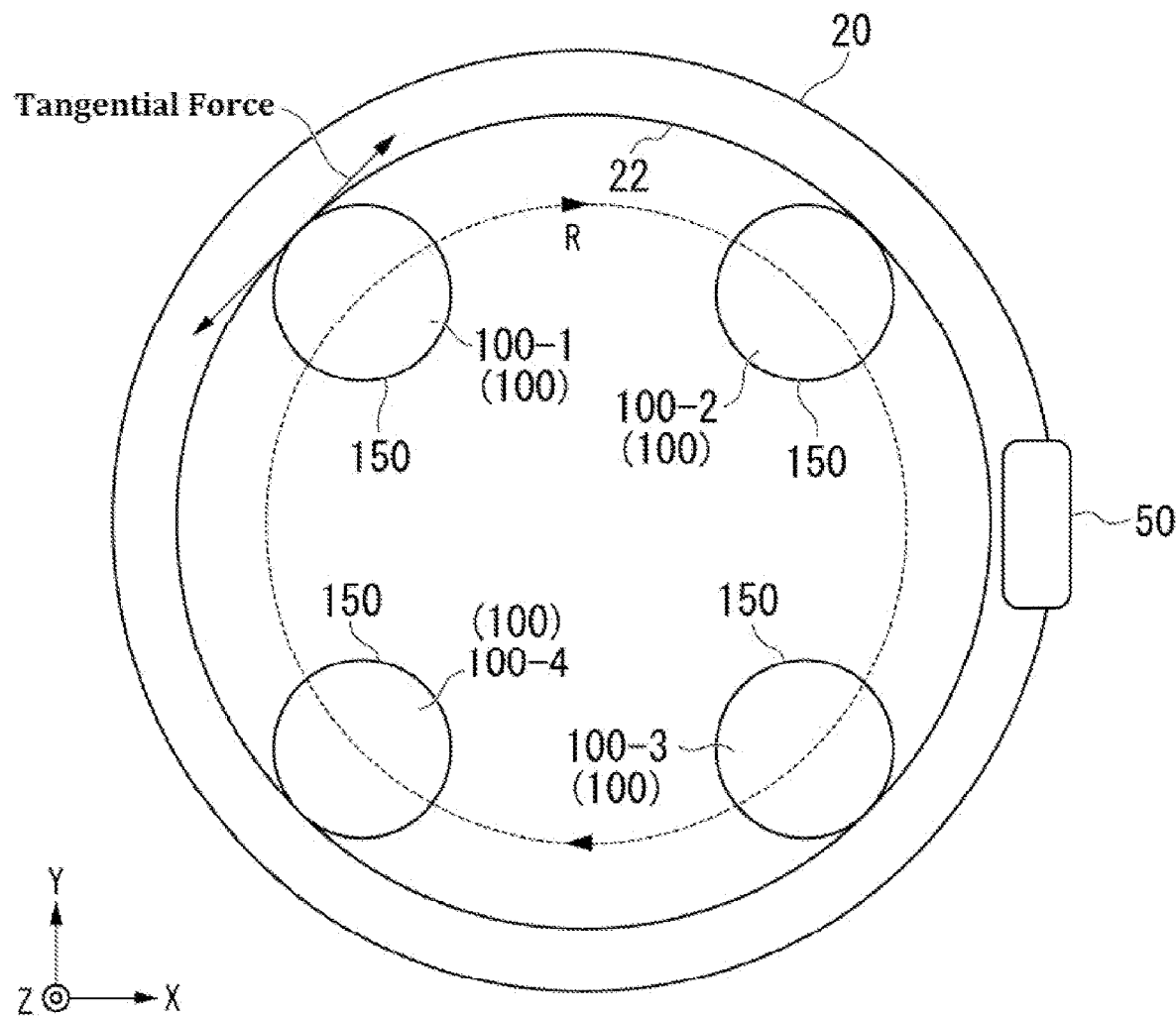
FIG. 2 is a top view showing a relationship between a tower and a yaw drive device according to the first embodiment.
Figure 3:
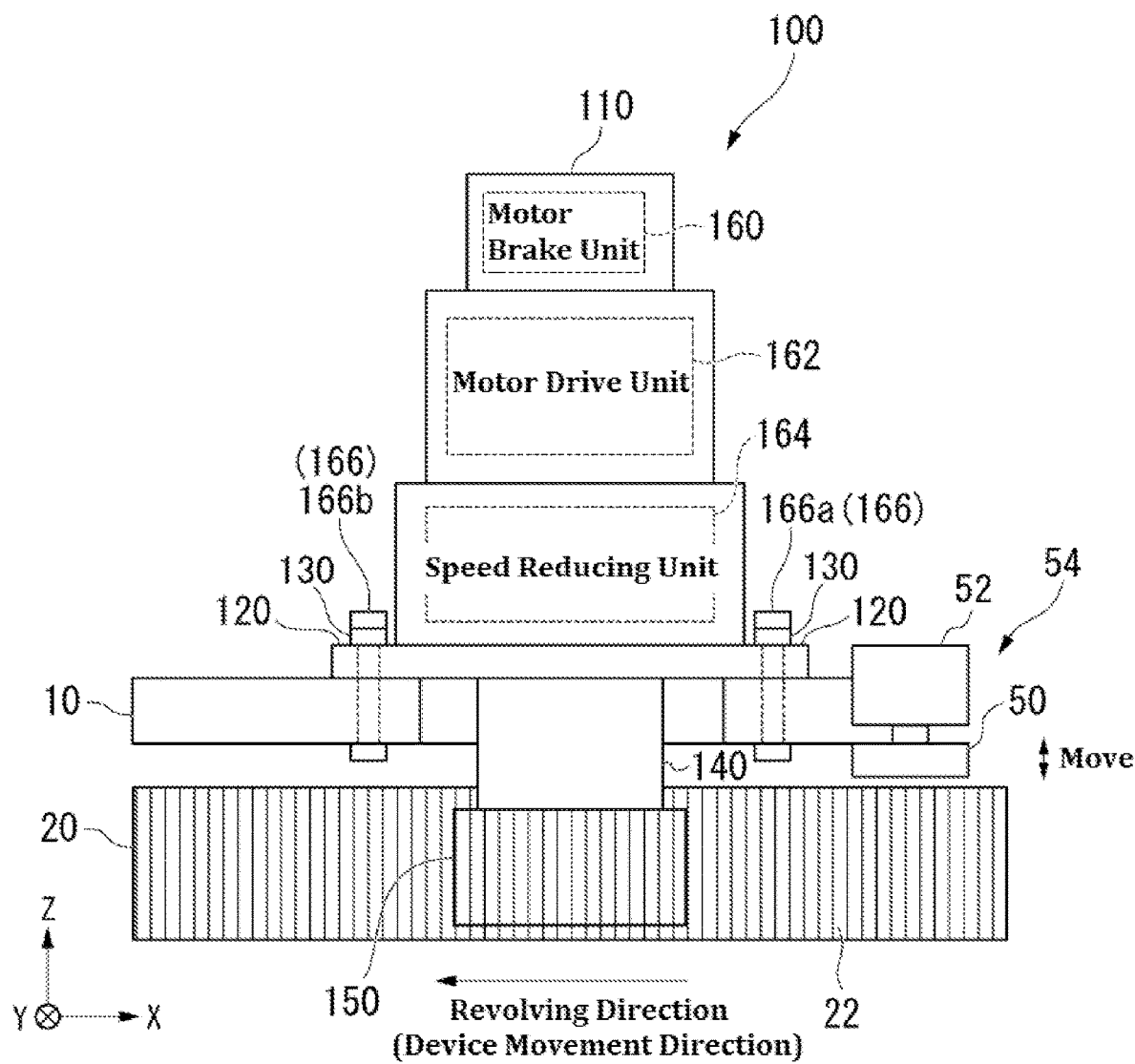
FIG. 3 illustrates the yaw drive device according to the first embodiment.

FIG. 2 is a top view showing a relationship between the tower and the yaw drive device according to the first embodiment. FIG. 3 illustrates the yaw drive device according to the first embodiment. Referring to FIGS. 2 and 3, the wind turbine 1 includes a ring gear 22, a yaw drive device 100, and a brake device 54. The ring gear 22 is fixed to the tower 20. The ring gear 22 is positioned on the top portion of the tower 20. The ring gear 22 is disposed on an inner wall of the tower 20. The ring gear 22 is used to drive the turning of the nacelle 10 in the yaw direction. Alternatively, the ring gear 22 may be disposed on an outer wall of the tower 20.

The yaw drive device 100 is fixed to the nacelle 10. The yaw drive device 100 drives a pinion 150 meshing with the ring gear 22 to rotate the wind turbine in the yaw direction.

In the embodiment, four yaw drive devices 100-1, 100-2, 100-3, and 100-4 are mounted to the nacelle 10. These yaw drive devices 100-1, 100-2, 100-3, and 100-4 may be hereinafter collectively referred to simply as "the yaw drive devices 100." The yaw drive devices 100 are driven and rotated in the R direction in FIG. 2 by the motor drive force. The yaw drive devices 100 may also be able to be driven and rotated in the opposite direction to the R direction.

With the ring gear 22 and the pinion gears 150 meshing with each other, a force such as a gust of wind applied to the nacelle 10, the tower 20 or the like generates a tangential force between the ring gear 22 and the pinion gears 150. The tangential force is generated in the tangential direction of the gear forming surface of the ring gear 22. The tangential force applies a torsional stress to a speed reducing unit 164 of each of the yaw drive devices 100. The tangential force applies a tensile stress and a compressive stress to a fastener in each of the yaw drive devices 100.

The yaw drive device 100 includes a casing 110, a flange 120, bolts 130, an output shaft 140, and a pinion 150.

The flange 120 is mounted to the casing 110. The flange 120 is connected to the nacelle 10 with the bolts 130. The bolt 130 is an example of fasteners used to secure the yaw drive device 100 to the nacelle 10. The fasteners are not limited to the bolts 130 but may be other known members.

One end (+Z end) of the output shaft 140 is connected to the interior of the casing 110 and the flange 120. The other end (−Z end) of the output shaft 140 has the pinion gear 150 provided thereon. The output shaft 140 and pinion 150 are examples of transmission parts that transmit driving and braking forces from the yaw drive device 100 to the tower 20.

The pinion 150 is positioned so as to mesh with the ring gear 22. The pinion 150 is rotated by the driving force outputted from the output shaft 140 to cause the yaw drive device 100 to revolve in the revolving direction (device movement direction). The yaw drive devices 100 in turn cause the nacelle 10 to turn in the yaw direction relative to the tower 20.

The yaw drive device 100 includes a motor brake unit 160, a motor drive unit 162, and a speed reducing unit 164.

The motor brake unit 160 generates a braking force for the output shaft 140. The motor brake unit 160 here applies the braking force directly to the output shaft 140. It is also possible that the braking force is applied indirectly to the output shaft 140. For example, the force of the motor brake unit 160 may be applied to a member other than the output shaft 140 and then applied to the output shaft 140 from this member.

The motor brake unit 160 generates the braking force by an electromagnetic action in accordance with a control signal provided externally. The motor brake unit 160 is configured to generate a braking force while being fed with a voltage. The brake unit 160 is configured not to generate a braking force when no voltage is supplied thereto. The motor brake unit 160 may be, for example, an electromagnetic brake. The motor brake unit 160 generates a higher braking force as the supplied electric power is higher. Alternatively, the motor brake unit 160 may be configured to generate a braking force when no voltage is supplied thereto. For example, the motor brake unit 160 may be an electromagnetic brake that applies brakes when no voltage is supplied thereto.

The motor drive unit 162 generates a drive force for the output shaft 140. The motor drive unit 162 is configured to cause an electromagnetic force to generate a driving force in response to a control signal fed from outside.

The speed reducing unit 164 reduces the rotation speed according to the drive force generated by the motor drive unit 162 to increase the drive torque. The function of the yaw drive device 100 is not limited to generating driving and braking forces. For example, the yaw drive device 100 may generate a braking force by generating a drive force in an opposite direction to the direction of the drive force for rotating the nacelle 10. In such a case, the yaw drive device 100 does not need to include the motor brake unit 160.

The yaw drive devices 100 each include bolt strain sensors 166a and 166b. The bolt strain sensors 166a and 166b are herein collectively referred to as "bolt strain sensors 166". The bolt strain sensors 166 are an example of an obtaining unit for obtaining information on the load. The bolt strain sensors 166 measure the strain on the bolts 130 used to attach the yaw drive device 100 to the nacelle 10. The strain sensors 166 each output a signal corresponding to the strain generated in the bolt 130. The strain generated in the fastening bolts 130 change in accordance with the tangential force.

The brake device 54 presses a friction body 50 against the ring gear 22 to keep the nacelle 10 from turning in the yaw direction. The brake device 54 is a hydraulic brake for applying a braking force to the ring gear 22. For example, the brake device 54 includes a caliper brake mechanism. The brake device 54 has a hydraulic braking unit 52 and the friction body 50.

The hydraulic brake unit 52 moves the friction body 50 in the Z direction shown in FIG. 3 in accordance with a control signal provided externally. The hydraulic brake unit 52 applies a braking force to the ring gear 22 by urging the friction body 50 against the ring gear 22. The wind turbine 1 is preferably capable of adjusting the braking force applied to the ring gear 22.

The brake device 54 is not limited to being a hydraulic brake. Alternatively, it may be a spring brake. For example, the spring force (biasing force) of the spring brake may apply a braking force to the ring gear 22. For example, the brake device 54 may include both a hydraulic brake and a spring brake. For example, the configuration of the brake device can be modified in accordance with design specifications.

Figure 4:
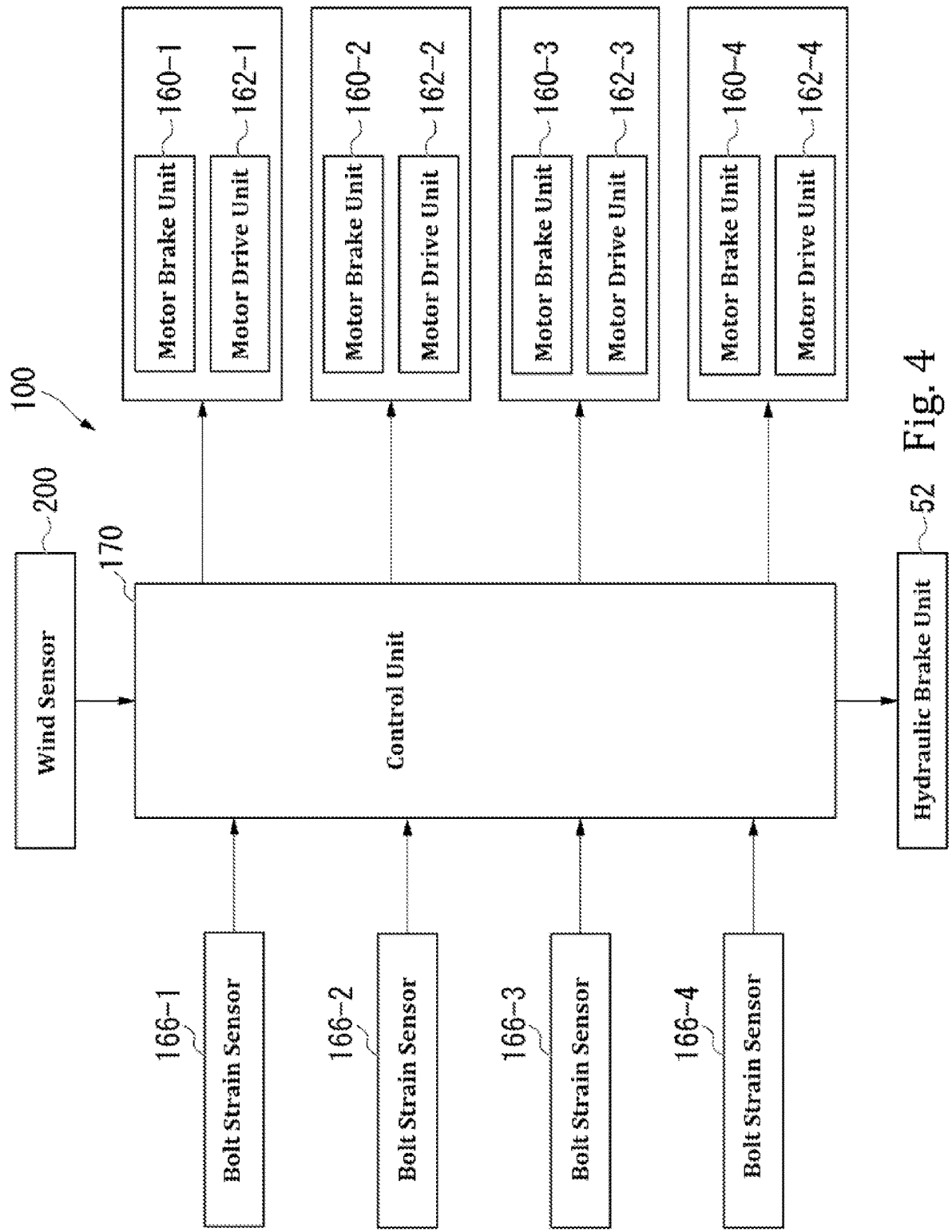
FIG. 4 is a block diagram of the wind turbine according to the first embodiment.

FIG. 4 is a block diagram of the wind turbine according to the first embodiment. Referring to FIG. 4, the yaw drive device 100 includes a control unit 170, bolt strain sensors 166-1, 166-2, 166-3, and 166-4, motor brake units 160-1, 160-2, 160-3, and 160-4, motor drive units 162-1, 162-2, 162-3, and 162-4, the hydraulic brake unit 52, and a wind sensor 200. The bolt strain sensors 166-1, 166-2, 166-3, and 166-4 may be hereinafter collectively referred to simply as "the bolt strain sensors 166", the motor brake units 160-1, 160-2, 160-3, and 160-4 may be hereinafter collectively referred to simply as "the brake units 160," and the motor drive units 162-1, 162-2, 162-3, and 162-4 may be hereinafter collectively referred to simply as "the motor drive units 162".

The bolt strain sensor 166-1 corresponds to the strain sensors 166a and 166b in the yaw drive device 100-1. The bolt strain sensor 166-2 corresponds to the strain sensors 166a and 166b in the yaw drive device 100-2. The bolt strain sensor 166-3 corresponds to the strain sensors 166a and 166b in the yaw drive device 100-3. The bolt strain sensor 166-4 corresponds to the strain sensors 166a and 166b in the yaw drive device 100-4. Each of the yaw drive devices 100 may include more than two bolt strain sensors 166.

The motor brake unit 160-1 corresponds to the motor brake unit 160 in the yaw drive device 100-1. The motor brake unit 160-2 corresponds to the motor brake unit 160 in the yaw drive device 100-2. The motor brake unit 160-3 corresponds to the motor brake unit 160 in the yaw drive device 100-3. The motor brake unit 160-4 corresponds to the motor brake unit 160 in the yaw drive device 100-4.

The motor drive unit 162-1 corresponds to the motor drive unit 162 in the yaw drive device 100-1. The motor drive unit 162-2 corresponds to the motor drive unit 162 in the yaw drive device 100-2. The motor drive unit 162-3 corresponds to the motor drive unit 162 in the yaw drive device 100-3. The motor drive unit 162-4 corresponds to the motor drive unit 162 in the yaw drive device 100-4.

The wind sensor 200 is disposed, for example, on the top surface of the nacelle 10. The wind sensor 200 detects wind speed and direction. The wind sensor 200 senses the wind speed and the wind direction and outputs the sensing results to the control device 170. The wind sensor 200 may be constituted by a wind speed sensor and a wind direction sensor.

The control unit 170 supervises four (an example of the plurality of) yaw drive devices 100. The control unit 170 is formed of, for example, a processor such as a CPU (Central Processing Unit) executing a program stored on a program memory. The control unit 170 may alternatively be formed of hardware such as an LSI (Large Scale Integration), an ASIC (Application Specific Integrated Circuit), or a FPGA (Field-Programmable Gate Array) or formed of software and hardware cooperating with each other.

The control unit 170 receives a strain sensing signal from each of the strain sensors 166-1, 166-2, 166-3, and 166-4. The control unit 170 receives a wind sensing signal (results of detection of the wind speed and direction) from the wind sensor 200. The control unit 170 outputs control signals to the brake units 160-1, 160-2, 160-3, and 160-4, the motor drive units 162-1, 162-2, 162-3, and 162-4, and the hydraulic brake unit 52 based on the strain sensing signals and the wind sensing signal.

<Braking Force Measuring Method>

Figure 5:
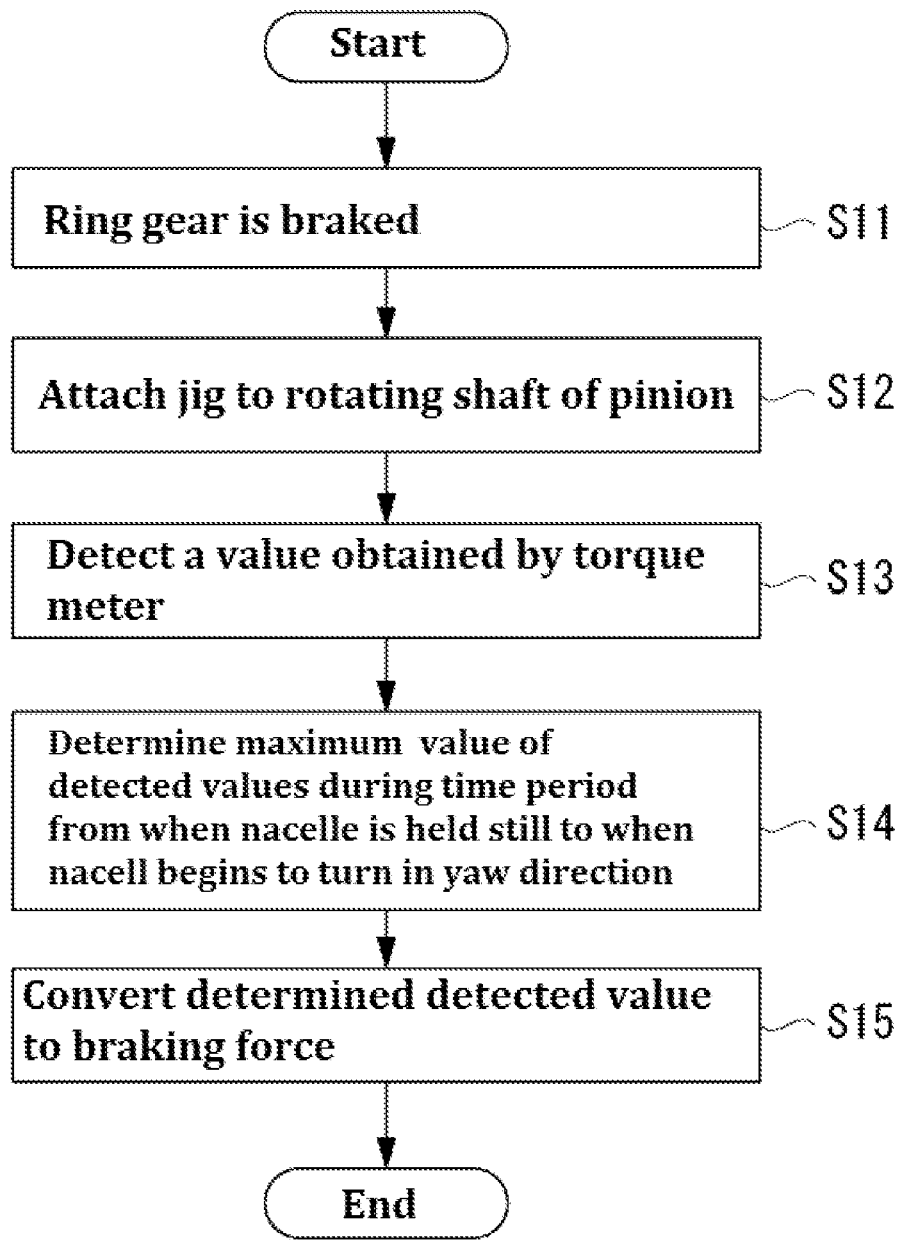
FIG. 5 is a flowchart of a method of measuring a braking force according to the first embodiment.
Figure 6:
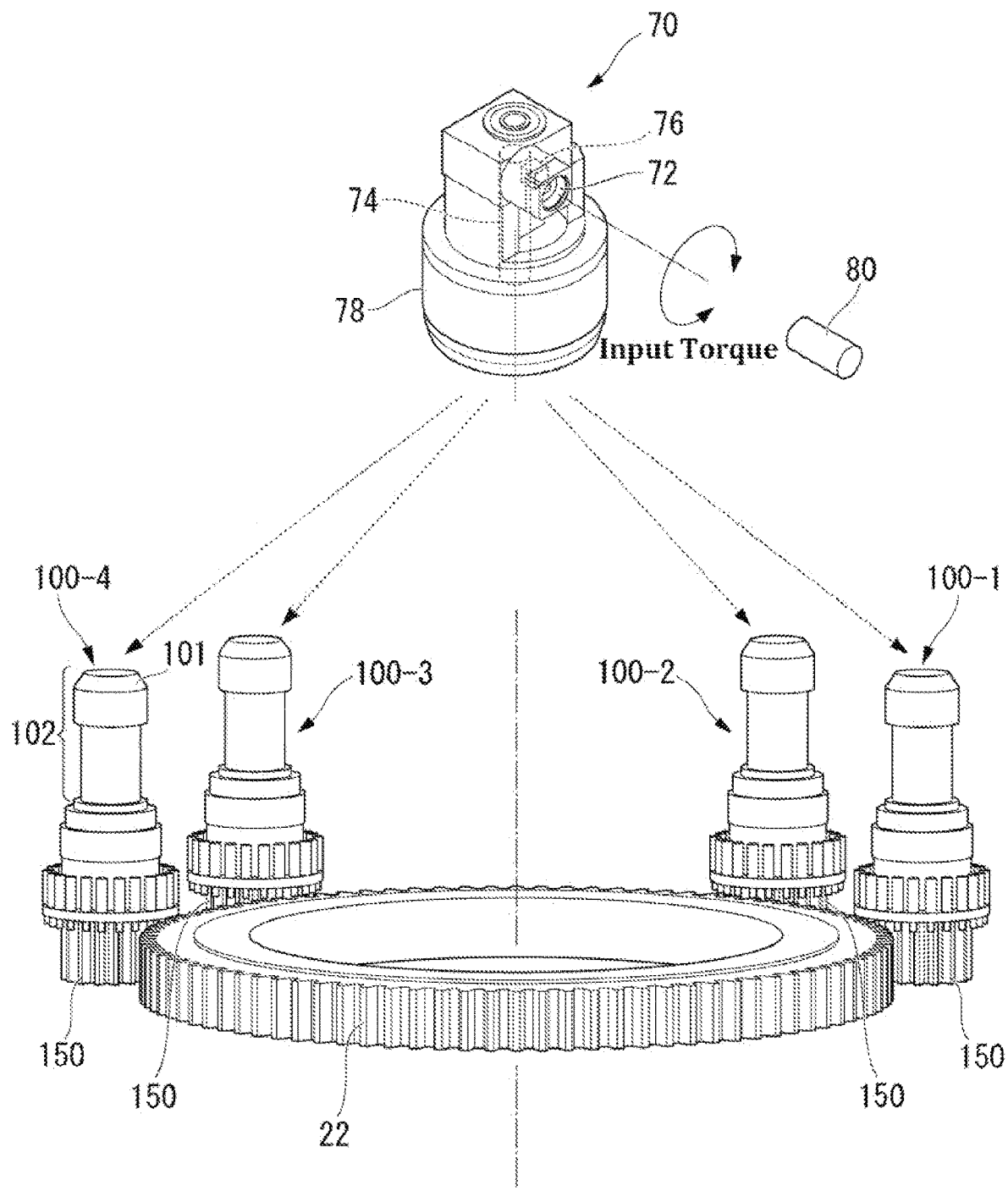
FIG. 6 shows perspective views of a jig and the yaw drive device according to the first embodiment.
Figure 7:
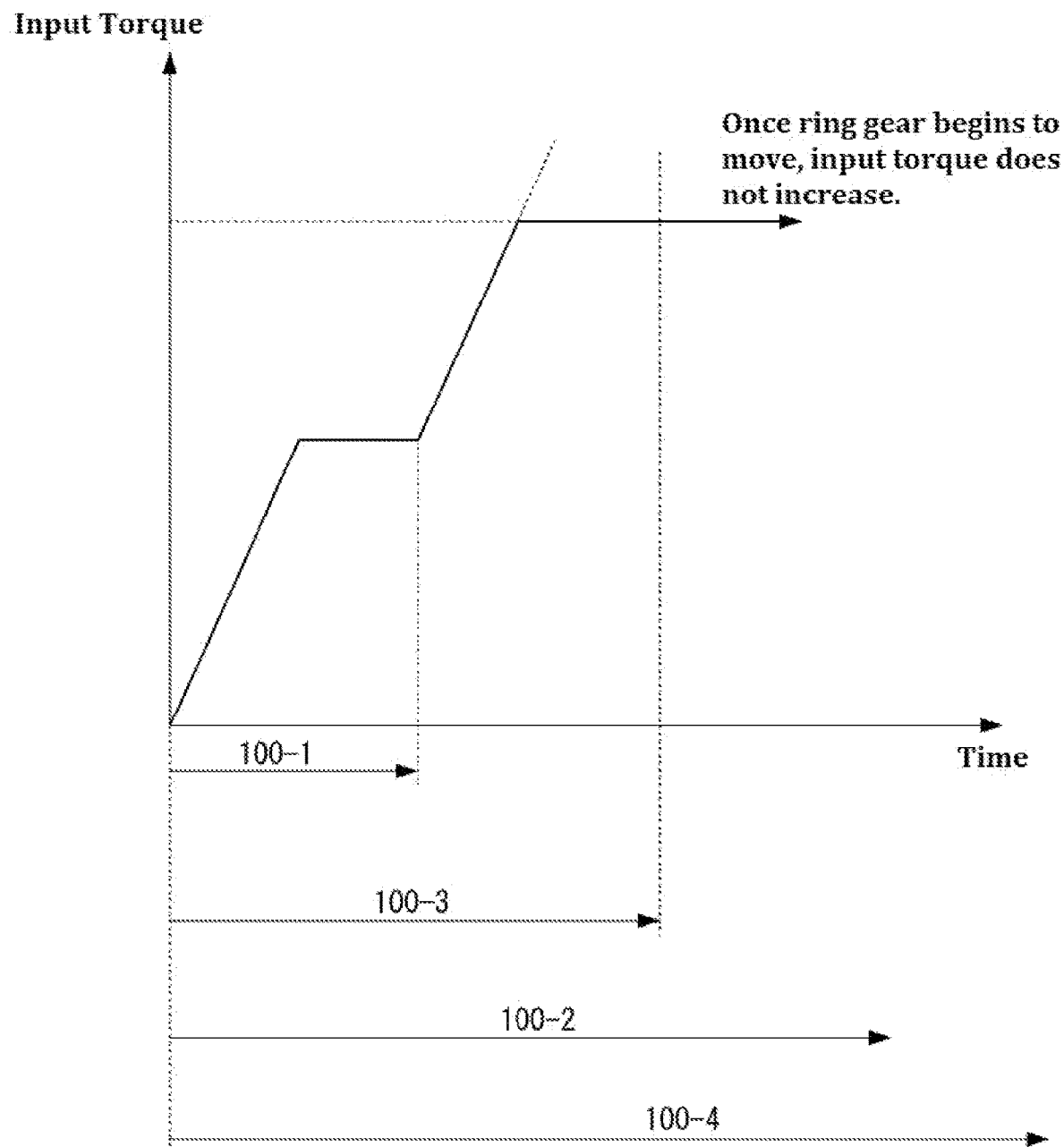
FIG. 7 illustrates a relationship between input torque and time.

A method of measuring a braking force of the brake device 54 in the wind turbine 1 according to the embodiment will be now described. FIG. 5 is a flowchart of the method of measuring a braking force according to the first embodiment. FIG. 6 shows perspective views of a jig and the yaw drive device according to the first embodiment. FIG. 7 illustrates a relationship between input torque and time. Referring to FIGS. 5 to 7, the method of measuring a braking force includes: a brake step (step S11) in which the brake device 54 brakes the ring gear 22; an attachment step (step S12) in which the jig 70 is attached to the rotating shaft of the pinion 150; a measurement step (step S13) of measuring the load on the rotating shaft of the pinion 150 that engages with the braked ring gear 22; a determination step (step S14) in which the nacelle 10 is first held still, an input torque is applied to the pinion 150 until the friction body 50 begins to slip and begins to turn in the yaw direction, and the maximum value of the load during a time period when the input torque is applied is determined; and a conversion step (step S15) in which the determined load is converted into the braking force.

In the brake step, a braking force is applied to the ring gear 22 by pressing the friction body 50 against the ring gear 22. This causes the ring gear 22 to be braked. After the brake step, the process proceeds to the attachment step.

For example, the jig 70 used in the attachment step includes an input portion 72 to which input torque is supplied from an external power device 80 and a worm gear 74 that reduces and transmits the input torque. The input portion 72 and the worm gear 74 may be configured to form a single body together. For example, the external power device 80 is an electric wrench, electric screwdriver, etc.

The jig 70 includes a cylindrical flange 78, the input portion 72, the worm gear 74, and a torque meter 76. The worm gear 74 and torque meter 76 are provided inside the cylindrical flange 78. The torque meter 76 is mounted on a rotating shaft that connects the input portion 72 and the worm gear 74.

The worm gear 74 is an example of a unidirectional rotation mechanism that permits rotation in one direction but limits rotation in the other direction. For example, the unidirectional rotation mechanism is not limited to the worm gear 74, but may also be formed of a clutch (e.g., one-way clutch, electromagnetic clutch, etc.). For example, the unidirectional rotation mechanism can be configured in various manners in accordance with design specifications.

For example, in the attachment step, the worm gear 74 of the jig 70 may be connected to the rotating shaft of the pinion 150 by removing the case 110 (see FIG. 3) or other parts of the yaw drive device 100. For example, in the attachment step, the cylindrical flange 78 of the jig 70 may be connected to the flange 120 (see FIG. 3) of the yaw drive device 100 with the bolts 130 (see FIG. 3). The bolts 130 are an example of the attaching member that attaches the jig 70 to the rotating shaft of the pinion 150. For example, the attaching member of the jig 70 is not limited to the bolts 130, but may be any other member.

For example, in the attachment step, the jig 70 may be attached directly to the rotating shaft of the pinion 150 by removing a fan cover 101 (see FIG. 6). For example, in the attachment step, the jig 70 may be attached directly to the rotating shaft of the pinion 150 by removing a motor 102 (see FIG. 6). For example, the method of attaching the jig 70 to the rotating shaft of the pinion 150 may be modified according to the design specifications.

In the method of measuring a braking force, the wind turbine 1 has four (one example of the plurality) pinions 150 that mesh with the ring gear 22. In the attachment step, the jig 70 is attached to each of the rotating shafts of the four (one example of the plurality) pinions 150. After the attachment step, the process proceeds to the measurement step.

In the measurement step, the value obtained by the torque meter 76 is used as the measured load. In the measurement step, the load on the rotating shaft of the pinion 150 meshing with the braked ring gear 22 may be measured indirectly. After the measurement step, the process proceeds to the determination step.

In the determination step, the nacelle 10 is first held still, input torque is applied to the pinion 150 from the external power device 80 until the friction body 50 begins to slip and the nacelle 10 begins to turn in the yaw direction, and the maximum value of the load (detected by the torque meter 76) during that time is determined.

In the determination step, the nacelle 10 is first held still, a first input torque is inputted from the external power device 80 to the input portion 72 of the first jig 70 (e.g., the jig 70 attached to the yaw drive device 100-1) of the four (one example of the plurality) jigs 70. The second input torque is subsequently inputted from the external power device 80 to the input portion 72 of the second jig 70 (e.g., the jig 70 attached to the yaw drive device 100-3) located diagonally to the first jig on the circumference along the ring gear 22 among the plurality of the jigs 70.

In the determination step, the nacelle 10 is first held still, and the first input torque is then inputted from the external power device 80 to the input portion 72 of the first jig 70 (e.g., the jig 70 attached to the yaw drive device 100-1) among the plurality of the jigs 70. For example, the first input torque may be inputted such that it gradually increases to a first predetermined value (e.g., an upper limit of the first input torque).

In the determination step, the nacelle 10 is first held still, and the second input torque is then inputted from the external power device 80 to the input portion 72 of the second jig 70 (e.g., the jig 70 attached to the yaw drive device 100-3 among the plurality of the jigs 70). For example, the second input torque may be inputted such that it gradually increases to a second predetermined value (e.g., an upper limit of the second input torque).

The example of FIG. 7 shows the state in which the ring gear 22 against which the friction body 50 is pressed begins to move before the second input torque to the input portion 72 of the jig 70 attached to the yaw drive device 100-3 reaches the second predetermined value. Once the ring gear 22 begins to move, the second input torque does not increase anymore. In this case, the value detected by the torque meter 76 is a static value. Strictly speaking, it rotates by an internal gap.

For example, when the first input torque (first predetermined value) is 100 and the second input torque (second input torque before reaching the second predetermined value) is 50, the total input torque is 150. For example, in the determination step, the above total input torque value is determined as the maximum value of the load (detected by the torque meter 76) during the time period from when the nacelle 10 is held and to when the friction body 50 begins to slip and the nacelle 10 begins to turn in the yaw direction. After the determination step, the conversion step is performed.

In the conversion step, the determined load (detected by the torque meter 76) is converted to a braking force. For example, in the conversion step, the input torque described above may be converted to an output torque, and the converted output torque may be considered as the braking force of the brake device 54. For example, the output torque is calculated by the following formula 1.

$$Tout = Tin \times A \times B \times H \qquad \text{[Formula 1]}$$

In the above Formula 1, "Tout" is the output torque, "Tin" is the input torque, "A" is the reduction ratio of the jig 70, "B" is the reduction ratio of the yaw drive device 100, and "H" is a coefficient. The reduction ratio A corresponds to the reduction ratio of the reduction mechanism (e.g., the mechanism including the worm gear 74, etc.) of the jig 70. The reduction ratio B corresponds to the reduction ratio of the reduction mechanism (e.g., the mechanism including speed reducing unit 164, etc.) that the yaw drive device 100 has.

In the conversion step, the converted output torque is considered as the braking force of the brake device 54.

However, this is not limited. For example, if a correspondence relationship (e.g., a relationship graph, etc.) between the above input torque and the braking force of the brake device 54 is configured in advance, the braking force of the brake device 54 may be determined based on the relationship graph, etc.

Advantageous Effects

The method of measuring the braking force of the brake device 54 in the wind turbine 1 has been described. The wind turbine 1 includes the ring gear 22 fixed to the tower 20 of the wind turbine 1, the yaw drive device 100 fixed to the nacelle 10 and driving the pinion 150 meshing with the ring gear 22 to make the wind turbine 1 turn in the yaw direction, and the brake device 54 that keeps the nacelle 10 to prevent the nacelle 10 from turning in the yaw direction by pressing the friction body 50 against the ring gear 22. The method of measuring a braking force includes: the brake step in which the brake device 54 brakes the ring gear 22; the measurement step to measure the load on the rotating shaft of the pinion 150 that engages with the braked ring gear 22; the determination step in which the input torque is applied to the pinion 150 until the friction body 50 begins to slip and the nacelle 10 that has been held still begins to turn in the yaw direction and the maximum value of the load is determined during the time period when the input torque is applied to the pinion 150; and the conversion step in which the determined load is converted into the braking force.

With this configuration, the braking force of the brake device 54 can be measured by applying input torque to the pinion 150 until the friction body 50 begins to slip and the nacelle 10 that has been held still begins to turn in the yaw direction, determining the maximum value of the load during that time, and converting the determined load (maximum value) to the braking force. Thus, the braking force of the brake device 54 can be measured without the need to directly pull the blades 30 or hub 40 with large heavy machinery. Therefore, the braking force of the brake device 54 can be measured safely and easily.

This method of measuring the braking force further includes the attachment step in which the jig 70, which includes the input portion 72 to which the input torque is inputted from the external power device 80 and the worm gear 74 that reduces and transmits the input torque, is attached to the rotating shaft of the pinion 150. In the determination step, with the nacelle 10 held, input torque is applied to the pinion 150 from the external power device 80 until the friction body 50 begins to slip and the nacelle 10 begins to turn in the yaw direction, and the maximum value of the load during this period is determined. With this configuration, once the jigs 70, which each includes the input portion 72 and the worm gear 74 integrated therein, are attached to the rotating shafts of the pinions 150, the nacelle 10 is held through the input portion 72 and the worm gear 74 of the jig 70. The external power device 80 supplies the input torque to the pinion 150 until the friction body 50 begins to slip and the nacelle 10 begins to turn in the yaw direction, and the maximum value of the load during that time can be determined. The determined load (maximum value) can then be converted to the braking force. In this way, the braking force of the brake device 54 can be measured. Thus, the braking force of the brake device 54 can be measured safely and easily with a simple configuration using the jigs 70 and the external power device 80.

In this embodiment of the method of measuring a braking force, the wind turbine 1 has a plurality of the pinions 150 that mesh with the ring gear 22. In the attachment step, the jig 70 is attached to each of the plurality of pinions 150. In the determination step, the nacelle 10 is first held still, the first input torque is inputted from the external power device 80 to the input portion 72 of the first jig 70 (e.g., the jig 70 attached to the yaw drive device 100-1) among a plurality of the jigs 70. The second input torque is then inputted from the external power device 80 to the input portion 72 of the second jig 70 (e.g., the jig 70 attached to the yaw drive device 100-3) located diagonally to the first jig on the circumference along the ring gear 22 among the plurality of the jigs 70. If the first input torque is inputted from the external power device 80 to the input portion 72 of the first jig 70 (e.g., the jig 70 attached to the yaw drive device 100-1) and then the second input torque is inputted from the external power device 80 to the input portion 72 of the second jig 70 (e.g., the jig 70 attached to the yaw drive device 100-2) located adjacent to the first jig 70, the input torque is likely to be inputted unevenly to the ring gear 22. Whereas with the configuration of the embodiment, the nacelle 10 is first held still, the first input torque is then inputted from the external power device 80 to the input portion 72 of the first jig 70 (e.g., the jig 70 attached to the yaw drive device 100-1) among the plurality of jigs 70, and subsequently the second input torque is inputted from the external power device 80 to the input portion 72 of the second jig 70 (e.g., the jig 70 attached to the yaw drive device 100-3) located diagonally to the first jig on the circumference of the ring gear 22 among the plurality of jigs 70. In this way, the torque can be evenly inputted to the ring gear 22. Thus, it is possible to prevent the input torque from being unevenly applied to the ring gear 22.

In the method of measuring a braking force, each of the jigs 70 further includes the torque meter 76 attached to the rotating shaft that connects the input portion 72 and the worm gear 74. In the measurement step, the value obtained by the torque meter 76 is used as the measured load. With such a configuration, the nacelle 10 is first held still via the input portions 72 and the worm gears 74 of the jigs 70, the input torque is applied to the pinion 150 from the external power device 80 until the friction body 50 begins to slip and the nacelle 10 begins to turn in the yaw direction, and the maximum value of the load (detected by the torque meter 76) during that time can determined. The load (maximum value) detected by the torque meter 76 can then be converted to the braking force. In this way, the braking force of the brake device 54 can be measured. With such a simple configuration using the jigs 70 and the external power device 80, it is possible to measure the braking force of the brake device 54 safely and easily.

Modification Examples of First Embodiment

In the embodiment described above, the wind turbine includes the plurality of pinions meshing with the ring gear. In the attachment step, the jig is attached to each of the plurality of pinions. In the determination step, the nacelle is first held still, the first input torque is then inputted from the external power device to the input portion of the first jig among the plurality of jigs. The second input torque is then inputted from the external power device to the input portion of the second jig located diagonally to the first jig on the circumference along the ring gear among the plurality of jigs. However, the embodiment is not limited to this example. For example, the nacelle is first held still, the first input torque is inputted from the external power device to the input portion of the first jig among the plurality of jigs.

The second input torque may be subsequently inputted from the external power device to the input portion of the second jig that is located adjacent to the first jig. For example, the input torque can be inputted from the external power device to the input portion of the given jig when the nacelle is held still. For example, the manner in which the input torque is inputted to the jig can be changed according to the design specifications.

In the embodiment described above, the jig further includes the torque meter attached to the rotating shaft that connects the input portion and the worm gear. In the measurement step, the detected value of the torque meter is used as the measured load. However, the embodiment is not limited to this. For example, the jig may not have the torque meter. For example, in the measurement step, the load on the rotating shaft of the pinion that engages the braked ring gear may be directly measured. For example, how the torque meters are installed can be provided in various manners in accordance with design specifications.

Second Embodiment

The following describes a method of measuring a braking force according to the second embodiment. In the following description, parts having the same functions as those of the first embodiment will have the same names and reference numerals, and their functions will not be described.

Figure 8:
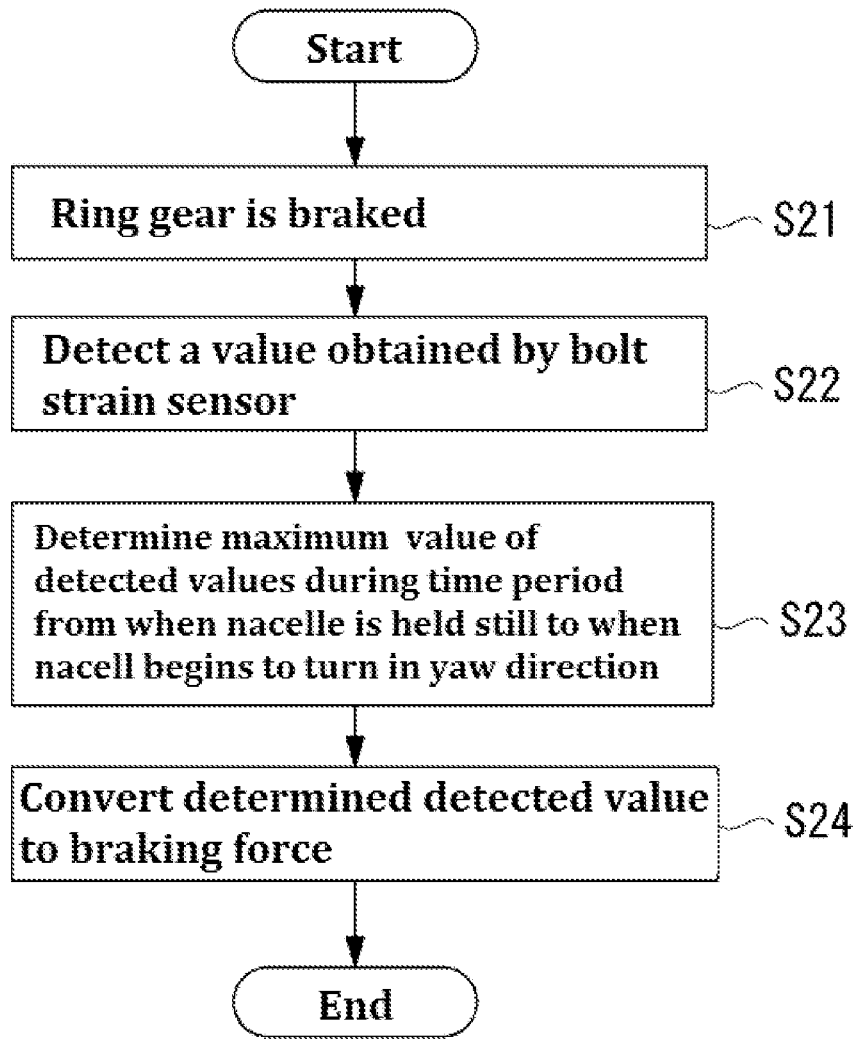
FIG. 8 is a flowchart of a method of measuring a braking force according to a second embodiment.
Figure 9:
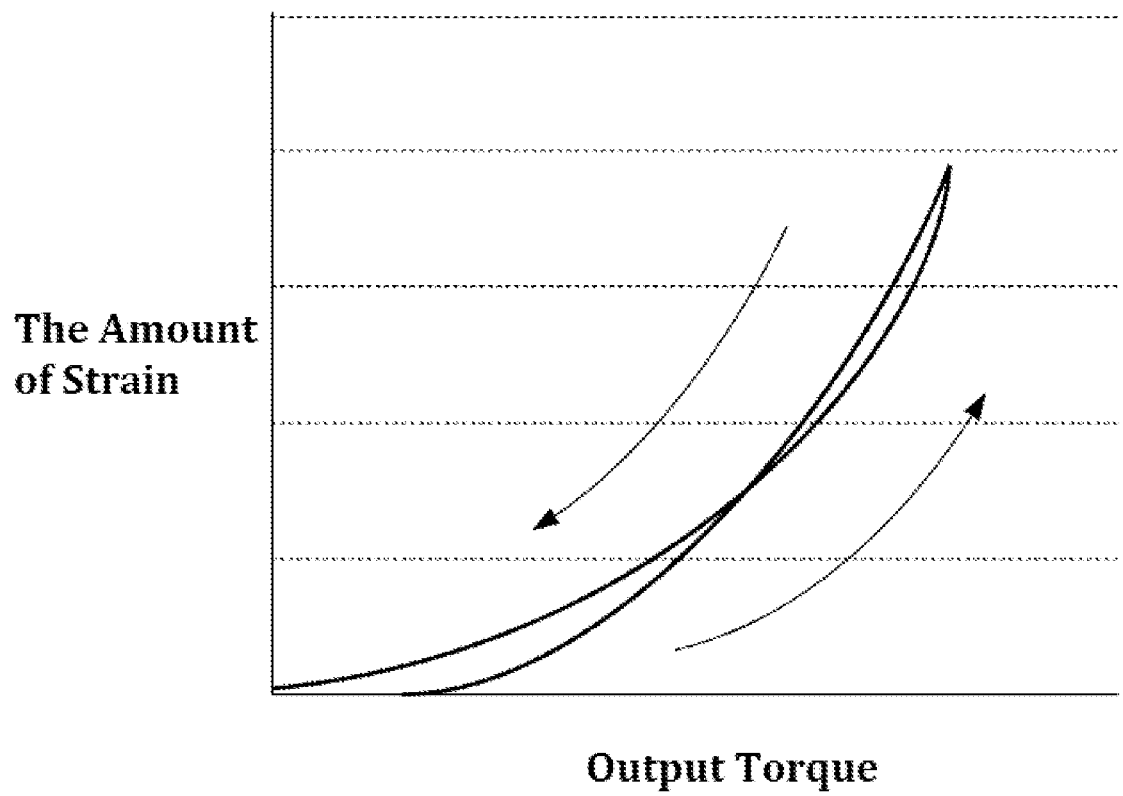
FIG. 9 illustrates a relationship between the amount of strain and output torque.

FIG. 8 is a flowchart of the method of measuring a braking force according to the second embodiment. FIG. 9 illustrates a relationship between the amount of strain and output torque. The amount of strain corresponds to the value detected by the bolt strain sensor. Referring to FIGS. 8 to 9, the method of measuring a braking force according to the second embodiment includes: a brake step (step S21) in which the brake device 54 brakes the ring gear 22; a measurement step (step S22) to measure the load on the rotating shaft of the pinion 150 that engages with the braked ring gear 22; a determination step (step S23) in which an input torque is applied to the pinion 150 until the friction body 50 begins to slip and the nacelle 10 that has been held still begins to turn in the yaw direction and the maximum value of the load during that time is determined; and a conversion step (step S24) in which the determined load is converted into the braking force. Compared to the flowchart of the first embodiment shown in FIG. 5, the braking force measurement method of the second embodiment does not include the jig 70 attachment step. The jig is not necessary only when the bolt strain sensor has been calibrated in advance (to understand the conversion formula between the sensor measurement results and the braking force).

In the brake step, a braking force is applied to the ring gear 22 by pressing the friction body 50 against the ring gear 22. This causes the ring gear 22 to be braked. After the brake step, the process proceeds to the measurement step.

As mentioned above, the wind turbine 1 has the bolt strain sensors 166 that measure the strain on the bolts 130 that attach the yaw drive devices 100 to the nacelle 10. In the measurement step according the second embodiment, the value obtained by the torque meter 166 is used as the measured load. In the measurement step, the load on the rotating shaft of the pinion 150 meshing with the braked ring gear 22 may be measured indirectly. After the measurement step, the process proceeds to the determination step.

In the determination step according to the second embodiment, the nacelle 10 is first held still, input torque is then applied to the pinion 150 from the external power device 100 until the friction body 50 begins to slip and the nacelle 10 begins to turn in the yaw direction, and the maximum value of the load (detected by the bolt strain sensor 166) during this period is determined.

In the determination step, with the nacelle 10 held still, a first input torque is inputted from a first yaw drive device 100 (e.g., the yaw drive device 100-1) among the plurality of the yaw drive devices 100. A second input torque is then inputted from a second yaw drive device 100 located diagonally to the first yaw drive device on the circumference along the ring gear 22 (e.g., the yaw drive device 100-3) among the plurality of the yaw drive devices 100.

In the determination step, the nacelle 10 is first held still, and the first input torque is then inputted from the first yaw drive device 100 (e.g., the yaw drive device 100-1) among the plurality of the yaw drive devices 100. For example, the first input torque may be inputted such that it gradually increases to a first predetermined value (e.g., an upper limit of the first input torque).

In the determination step, the nacelle 10 is held still, and the second input torque is subsequently inputted from the second yaw drive device 100 (e.g., the yaw drive device 100-3) among the plurality of the yaw drive devices 100. For example, the second input torque may be inputted such that it gradually increases to a second predetermined value (e.g., an upper limit of the second input torque).

The embodiment is not limited to the case where the input torque from the yaw drive devices 100 is gradually increased. For example, each of the yaw drive devices 100 (e.g., the yaw drive devices 100-1, 100-2, 100-3, and 100-4) of the multiple pinions 150 may be controlled all at once. For example, if the ring gear 22 begins to move after the second time increase of the input torque, the input torque from the yaw drive devices 100 will not increase any more. In this case, the detected value of the bolt strain sensor 166 becomes a static value.

For example, in the determination step, this static value is determined as the maximum value of the load (detected by the bolt strain sensor 166) during the time period from when the nacelle 10 is first held still and to when the friction body 50 begins to slip and the nacelle 10 begins to turn in the yaw direction. After the determination step, the conversion step is performed.

In the conversion step, the determined load (detected by the bolt strain sensor 166) is converted to a braking force. For example, in the conversion step, the static value described above may be converted to an output torque, and the converted output torque may be considered as the braking force of the brake device 54. For example, as shown in FIG. 9, if a correspondence relationship (e.g., a relationship graph, etc.) between the above static value (amount of strain) and the output torque is configured in advance, the braking force of the brake device 54 may be determined based on the relationship graph, etc.

Advantageous Effects

In the method of measuring a braking force according to the embodiment, the wind turbine 1 has the bolt strain sensors 166 that measure the strain on the bolts 130 that attach the yaw drive devices 100 to the nacelle 10. In the measurement step, the value detected by the bolt strain sensor 166 is used as the measured load. With this configuration, the braking force of the brake device 54 can be measured by applying input torque to the pinion 150 until the friction body 50 begins to slip and the nacelle 10 that has been held still begins to turn in the yaw direction, determining the maximum value of the load (value detected by the bolt strain sensor 166) during the application of the input torque, and converting the determined value (maximum value) detected by the bolt strain sensor 166 to the braking force. Thus, the braking force of the brake device 54 can be measured safely and easily with a simple configuration using the bolt strain sensors 166.

In the determination step according to the second embodiment, the nacelle 10 is first held still, input torque is applied to the pinion 150 from the yaw drive device 100 until the friction body 50 begins to slip and the nacelle 10 begins to turn in the yaw direction, and the maximum value of the load during the application of the input torque is determined. With this configuration, the nacelle 10 is first held still, the input torque is then applied to the pinion 150 from the external power device 100 until the friction body 50 begins to slip and the nacelle 10 begins to turn in the yaw direction, and the maximum value of the load (detected by the bolt strain sensor 166) during that period can be determined. The load (maximum value) detected by the bolt strain sensor 166 can then be converted to the braking force. In this way, the braking force of the brake device 54 can be measured. With such a simple configuration using the yaw drive devices 100, it is possible to measure the braking force of the brake device 54 safely and easily.

Modification Example of Second Embodiment

In the embodiments described above, the wind turbine has the bolt strain sensor measuring the strain on the bolt that attaches the yaw drive device to the nacelle, and in the measurement step, the detected value of the bolt strain sensor is used as the measured load, but the embodiment is not limited to this. For example, the wind turbine may not have the bolt strain sensors. For example, in the measurement step, the load on the rotating shaft of the pinion that engages the braked ring gear may be directly measured. For example, how the bolt strain sensors are installed can be provided in various manners in accordance with design specifications.

Other Modification Examples

The technical scope of the present invention is not limited to the embodiments described above but is susceptible of various modification within the purport of the present invention.

The above embodiments are described with the examples in which the ring gear is fixed to the tower and the yaw drive devices are fixed to the nacelle. Alternatively, the ring gear may be fixed to the nacelle and the yaw drive devices may be fixed to the tower. For example, the manner in which the ring gear and yaw drive devices are fixed to the tower or nacelle of the wind turbine can be changed according to the design specifications.

The functions of the control unit 170 according to the embodiment described above may be implemented in a program stored on a computer-readable storage medium, and the program stored on the storage medium may be loaded onto a computer system that then executes the program for processing. The "computer system" mentioned above may include an operating system (OS) or hardware such as peripheral devices. The "computer-readable storage medium" mentioned above refers to a storage device such as a portable medium like a flexible disc, a magneto-optical disc, a ROM (Read Only Memory), a flash memory or other writable non-volatile memory, and a DVD (Digital Versatile Disc), and a hard disk built-in to the computer system.

Further, the "computer-readable storage medium" includes storage media that retain the program for some period of time, like a volatile memory (for example, DRAM (Dynamic Random Access Memory)) in an information processing device receiving the program through a network such as the Internet or a communication line such as a telephone line, and a computer system that operates as a client. The computer program mentioned above may be transmitted from a computer system that includes a storage device or the like storing the program to another computer system through a transmission medium or by a transmission wave in a transmission medium. The "transmission medium" for transmitting the program refers to a medium that operates to transmit information, like a network (communication network) such as the Internet or a communication line (communication wire) such as the telephone line. Only a part of the functions described above may be implemented in the above program. Further, the functions described above may be implemented by a combination of the above program and other programs previously stored on the computer system. That is, the above program may be what is called a difference file (a difference program).

The elements of the embodiments described above may be replaced with known elements within the purport of the present invention. Further, the variations described above may be combined. In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention. According to the foregoing embodiments disclosed herein, a plurality of functions are distributively provided. Some or all of the functions may be integrated. Any one of the functions may be partly or entirely segmented into a plurality of functions, which are distributively provided. Irrespective of whether or not the functions are integrated or distributed, they are acceptable as long as they are configured to attain the object of the invention.

What is claimed is:

1. A method of measuring a braking force of a brake device in a wind turbine, the wind turbine including: a ring gear fixed to one of a tower of the wind turbine or a nacelle of the wind turbine; a yaw drive device driving a pinion that meshes with the ring gear to turn the wind turbine in a yaw direction, the yaw drive device being fixed to the other of the tower or the nacelle; and the brake device pressing a friction body against the ring gear to keep the nacelle from turning in the yaw direction, the method comprising:
    a brake step of braking the ring gear by the brake device to keep the nacelle from turning in the yaw direction;
    a measurement step of measuring a load on a rotating shaft of the pinion that mesh with the braked ring gear;
    a determination step of determining a maximum value of the load during a time period that begins when input torque is applied to the pinion from the yaw drive device or an external power device with the nacelle held still, and ends when the friction body begins to slip and the nacelle that has been held still begins to turn in the yaw direction; and
    a conversion step of converting the determined load to the braking force.

2. The method of claim 1, further comprising an attachment step of attaching a jig to the rotating shaft of the pinion, the jig including an input portion to which the input torque is applied to the pinion from the yaw drive device or the external power device and a worm gear that reduces and transmits the input torque, the input portion and the worm gear forming a single body together, wherein, in the determination step, the input torque is applied to the pinion from the external power device with the nacelle held still and until the friction body begins to slip and the nacelle begins to turn in the yaw direction, and the maximum value of the load during the time period is determined.

3. The method of claim 2, wherein the wind turbine includes a plurality of the pinions that mesh with the ring gear, wherein, in the attachment step, the jig is attached to each of the plurality of pinions, and wherein in the determination step, with the nacelle held still, a first input torque is inputted from the external power device to the input portion of a first jig among a plurality of the jigs, a second input torque is subsequently inputted from the external power device to the input portion of a second jig located diagonally to the first jig on a circumference along the ring gear among the plurality of jigs.

4. The method of claim 2, wherein the jig further includes a torque meter attached to a rotating shaft that connects the input portion and the worm gear, and wherein, in the measurement step, a value obtained by the torque meter is used as the measured load.

5. The method of claim 1, wherein the wind turbine includes a bolt strain sensor for measuring strain on a bolt that attaches the yaw drive device to the nacelle, and wherein in the measurement step, the value detected by the bolt strain sensor is used as the measured load.

6. The method of claim 5, wherein, in the determination step, the input torque is applied to the pinion from the yaw drive device with the nacelle held still and until the friction body begins to slip and the nacelle begins to turn in the yaw direction, and the maximum value of the load during the time period is determined.

\* \* \* \* \*